Patented Aug. 13, 1940

2,211,219

UNITED STATES PATENT OFFICE 2,211,219

CATALYTIC DEHYDROGENATION

Carlisle M. Thacker, Toledo, Ohio, assignor to The Pure Oil Company, Chicago, Ill., a corporation of Ohio No Drawing. Application December 1, 1937, Serial No. 177,413

13 Claims. (Cl. 260—683)

This invention relates to method for dehydrogenating saturated hydrocarbon gases, and is more particularly concerned with the process of converting saturated hydrocarbon gases into olefins by means of catalysts, and with catalysts used in such processes.

It is well known that paraffinic hydrocarbons of low molecular weight can be cracked to produce olefins by subjecting them to high temperatures. The difficulty encountered in purely thermolytic cracking is that temperatures necessary to obtain the necessary degree of cracking are too high for practical purposes and the nature of the cracking cannot be controlled at these temperatures. At lower temperatures the yield of olefins per pass is too low for commercial purposes, particularly in the case of ethane. Although the amount of conversion that can be obtained by pyrolysis of propane and butane is satisfactory, side reactions occur which result in formation of methane and coke, thereby lowering the efficiency of the process.

In an effort to overcome these difficulties, much work has been done on the use of catalysts in connection with dehydrogenating work. By means of catalysts it is possible to reduce the cracking temperature and it is also possible to raise the efficiency of the cracking reaction. To my knowledge, however, no catalyst has been found which will retain its efficiency over long periods of use and effect dehydrogenation to the degree required by commercial operation.

I have found that by using certain metals and compounds in combination, a high degree of conversion can be obtained at moderate temperatures and the reaction is predominantly a dehydrogenating reaction. Catalysts prepared in accordance with my invention have the ability to maintain their activity for long periods of time.

One of the objects of my invention is to provide a method for dehydrogenating low boiling paraffinic hydrocarbons.

Another object of my invention is to provide a method for dehydrogenating low boiling hydrocarbons at moderate temperatures.

A still further object of my invention is to provide a method for dehydrogenating low boiling hydrocarbons by means of catalysts so that a high degree of conversion is effected with a high degree of efficiency.

Still another object of my invention is to provide a dehydrogenating catalyst which will effect dehydrogenation of low boiling hydrocarbons at moderate temperature and will maintain its efficiency over longer periods of time.

Other objects of my invention will be apparent from the following description:

In accordance with my invention, paraffinic hydrocarbon gases, such as ethane, propane and butane, or mixtures thereof, are contacted at temperatures between approximately 400°–725° C. with a catalyst comprising (1) a heavy metal belonging to Group I of the periodic table, the oxide of which is readily reducible, (2) a common metal belonging to Group VIII of the periodic table, and (3) an alkali metal compound having a basic reaction. The readily reducible heavy metals of Group I which may be used are copper, silver, or gold, or any mixture thereof; the common metals of Group VIII which may be used are iron, cobalt, or nickel, or mixtures thereof; and the alkali compounds which may be used in the catalyst are the oxides, carbonates, hydroxides, and weak acid salts of sodium, potassium, and lithium. The catalyst may be used alone or supported on a carrier such as pumice, kieselguhr, broken brick, bauxite, fuller's earth and silica gel.

The proportion of the constituents making up my composite catalyst may be varied at will within certain limits, but in all cases the catalyst should contain a major portion by weight of the readily reducible heavy metals of Group I with minor proportions of constituents from the other two classes.

The preferred method of preparing catalysts in accordance with my invention is to mix together solutions of salts or compounds of the constituents of Classes 1, 2 and 3 and add to the solution the carrier. The mass is subjected to heating and frequent stirring until liquid no longer settles to the bottom of the vessel. The partially dried catalyst is then completely dried at a temperature of approximately 120° C. and thereafter the catalyst is decomposed by blowing therethrough a stream of air at approximately 345° C. until the salts have been converted into oxides. The decomposed catalyst may then be placed in the converter or other chamber and reduced in a stream of dry hydrogen at a temperature of about 550° C. for a sufficient period of time to reduce the metallic oxide of Classes 1 and 2 to the metallic form. The catalyst is then ready for use.

The apparatus in which my process is carried out may be of any conventional form. The gas is preferably preheated prior to entering the conversion chamber. In all cases the conversion chamber should be heated to maintain it at the desired conversion temperature. The pressure under which the reaction takes place may be atmospheric, sub-atmospheric, or super-atmospheric. The reaction products may be used for any desired purpose. The gases may be fractionated to obtain substantially pure olefins; or the gases may be treated to convert them to chemical compounds such as alcohols; or the gases may be charged to a thermolytic or catalytic polymerization process in order to convert them to high boiling hydrocarbons such as gasoline or aromatics.

In a specific example of my invention, pumice of 8 to 14 mesh was first purified by treating it for eight hours in a Soxhlet extractor with about 6 normal hot hydrochloric acid. It was then washed with water until free of chlorides and dried in an electric oven. To 225 grams of the purified pumice was added a slurry containing 240 grams of cupric acetate, .84 gram of iron dissolved in a slight excess of acetic acid, and 2.07 grams of potassium carbonate dissolved in a slight excess of acetic acid. The mixture of pumice and salts was heated on a water bath with frequent stirring until no more settling of liquid occurred. The partly dried catalyst was then placed in an electric oven where drying was completed at about 120° C. The dried material was then blown with air at 350° C. for about three hours. The catalyst was then placed in the converter and reduced with a stream of hydrogen at 550° C. for about two hours. A number of runs were made in which ethane was passed through this catalyst. Results of these runs are tabulated in the table below.

Table

| Converter temperature, °C. | Space velocity* | Percent $C_2H_6$ reacting | Yield percent unsaturates based on charge | Exit gas Percent $C_2H_4$ | Exit gas Percent $H_2$ |
|---|---|---|---|---|---|
| 625 | 169 | 2.5 | 0.015 | 3.0 | 2.3 |
| 650 | 172 | 11.8 | 0.095 | 10.0 | 9.6 |
| 650 | 343 | 6.8 | 0.049 | 6.1 | 6.1 |
| 675 | 345 | 13.6 | 0.115 | 14.1 | 14.1 |

*Space velocity is volume of gas at standard temperature and pressure, entering the reactor per hour divided by the volume of catalyst.

In the runs listed in the table above, 75 to 90% of the reacting ethane was converted to ethylene. The table above indicates that a temperature of 675° C. is the most favorable for converting ethane to ethylene since the degree of conversion was the greatest and the efficiency of the reaction, that is, the percent of reacted ethane converted to ethylene, was the greatest.

The table also indicates that at 625° C. the reaction progresses very slowly. However, with the higher boiling hydrocarbons such as propane and butane, the lower limit of reaction is considerably decreased, and in the case of mixtures of the gas, it is between the optimum temperature for butane and the optimum temperature for ethane.

The activity of the catalyst is materially decreased by presence of steam. The tests tabulated in the table were all made on dry gas which had been passed through anhydrous calcium sulfate immediately prior to passing through the reactor or converter.

It should be understood that in preparing catalysts in accordance with my invention, salts other than the acetates may be used. Nitrates, chlorides, sulfates and other soluble salts may be substituted for the acetates. However, in such cases, the salts should be converted to the hydroxides, the catalyst partially dried and the partially dried catalyst washed free of chlorides, sulfates or other acid radical before addition of the alkali metal compound. The resulting material will then be decomposed and reduced in the manner above set forth.

In the specific catalyst above described, the molal ratio of copper, iron, potassium carbonate present in the reduced catalyst is approximately 80 to 1 to 1. It is to be understood, however, that these proportions are not limiting but that as previously said, the proportions may be varied over a wide range, being limited only by the fact that the copper or other metal belonging to the first class should constitute the major portion of the catalyst, and that sufficient of the alkali metal compound should be present to give the catalyst, as prepared and before use thereof, a basic reaction. It is preferable, however, that the molal ratio of the basic compound to the readily reducible metal of Group VIII be approximately 1 to 1.

I claim as my invention:

1. Method for dehydrogenating low boiling paraffinic hydrocarbons comprising contacting said hydrocarbons at elevated temperatures with a catalyst comprising (1) a heavy metal of Group I of the periodic table, the oxide of which is readily reducible, (2) a common metal of group VIII of the periodic table, and (3) an alkali metal compound having a basic reaction.

2. Method in accordance with claim 1 in which the hydrocarbons are contacted with the catalyst at a temperature between 400–725° C.

3. Method in accordance with claim 1 in which the heavy metal in Group I is copper.

4. Method in accordance with claim 1 in which the Group VIII metal is iron.

5. Method in accordance with claim 1 in which the alkali metal compound is potassium carbonate.

6. Method in accordance with claim 1 in which the catalyst is supported on pumice.

7. Method for dehydrogenating low boiling paraffinic hydrocarbons which comprises contacting said hydrocarbons at elevated temperatures with a catalyst comprising copper, iron and an alkali metal compound having an alkaline reaction.

8. Method in accordance with claim 7 in which the catalyst is supported on pumice.

9. Method in accordance with claim 7 in which the molal ratio of copper to iron in the catalyst is approximately 80 to 1.

10. Method in accordance with claim 7 in which the molal ratio of copper to iron to potassium carbonate is 80 to 1 to 1.

11. The method of dehydrogenating paraffinic hydrocarbon gases which comprises contacting said gases at temperatures of approximately 400–725° C. with a catalyst prepared by impregnating hydrochloric acid-extracted and washed pumice with readily decomposible salts of copper and iron and with a soluble alkaline metal compound having a basic reaction, drying the impregnated pumice, decomposing the salts by heating the dried pumice in air and subjecting the decomposed material to the reducing action of hydrogen at elevated temperature.

12. Method in accordance with claim 1 in which the heavy metal of Group I comprises the major portion by weight of the total catalyst.

13. Method in accordance with claim 7 in which copper comprises the major portion by weight of the total catalyst.

CARLISLE M. THACKER.